(12) United States Patent
Fu et al.

(10) Patent No.: US 12,320,719 B2
(45) Date of Patent: Jun. 3, 2025

(54) SENSING DEVICE

(71) Applicants: Measurement Specialties (China) Ltd., Shenzhen (CN); Measurement Specialties, Inc., Hampton, VA (US)

(72) Inventors: Tinghui (Felix) Fu, Shenzhen (CN); Vincent Wong, Fremont, CA (US); Xu Liang, Shenzhen (CN); Long (Allen) Wang, Shenzhen (CN)

(73) Assignees: TE Connectivity Solutions GmbH, Schaffhausen (CH); Measurement Specialties (China) Ltd., Shenzhen (CN)

( * ) Notice: Subject to any disclaimer, the term of this patent is extended or adjusted under 35 U.S.C. 154(b) by 427 days.

(21) Appl. No.: 18/045,600

(22) Filed: Oct. 11, 2022

(65) Prior Publication Data

US 2023/0115850 A1   Apr. 13, 2023

(30) Foreign Application Priority Data

Oct. 11, 2021 (CN) .......................... 202111179785.X

(51) Int. Cl.
G01L 13/02 (2006.01)
G01L 19/00 (2006.01)

(52) U.S. Cl.
CPC ........ *G01L 13/026* (2013.01); *G01L 19/0007* (2013.01); *G01L 19/0092* (2013.01)

(58) Field of Classification Search
CPC ............... G01L 13/026; G01L 19/0007; G01L 19/0092; G01L 15/00
See application file for complete search history.

(56) References Cited

FOREIGN PATENT DOCUMENTS

| AU | 2014328696 A1 | * | 3/2016 | ............. G01F 1/383 |
|---|---|---|---|---|
| CN | 110285916 A | * | 9/2019 | |
| FR | 2903185 A1 | * | 1/2008 | ............. G01L 15/00 |
| JP | WO2002079743 A1 | * | 7/2004 | |
| JP | 4044307 B2 | * | 2/2008 | ........... G01L 13/025 |
| JP | 2022550196 A | * | 11/2022 | |

* cited by examiner

*Primary Examiner* — Francis C Gray
(74) *Attorney, Agent, or Firm* — Barley Snyder

(57) ABSTRACT

A sensing device includes a body having a first chamber, a second chamber, and a liquid path which are filled with a liquid, the liquid path communicates with the second chamber, a pressure difference detection chip installed in the first chamber, and a pressure detection chip installed in the first chamber. The pressure difference detection chip seals an opening of the liquid path disposed on a bottom surface of the first chamber. The pressure difference detection chip detects a liquid pressure difference between the first chamber and the second chamber. The pressure detection chip detects a liquid pressure in the first chamber.

20 Claims, 5 Drawing Sheets

SENSING DEVICE

CROSS-REFERENCE TO RELATED APPLICATION

This application claims the benefit of the filing date under 35 U.S.C. § 119(a)-(d) of Chinese Patent Application No. 202111179785. X, filed on Oct. 11, 2021.

FIELD OF THE INVENTION

The present invention relates to a sensing device, in particular to a sensing device suitable for simultaneously detecting pressure and differential pressure.

BACKGROUND

In the prior art, a differential pressure sensor can only detect differential pressure, and a pressure sensor can only detect pressure. Therefore, in the prior art, if you want to detect pressure and differential pressure, you must provide a separate differential pressure sensor and a separate pressure sensor. This leads to high detection cost and inconvenient use.

SUMMARY

A sensing device includes a body having a first chamber, a second chamber, and a liquid path which are filled with a liquid, the liquid path communicates with the second chamber, a pressure difference detection chip installed in the first chamber, and a pressure detection chip installed in the first chamber. The pressure difference detection chip seals an opening of the liquid path disposed on a bottom surface of the first chamber. The pressure difference detection chip detects a liquid pressure difference between the first chamber and the second chamber. The pressure detection chip detects a liquid pressure in the first chamber.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
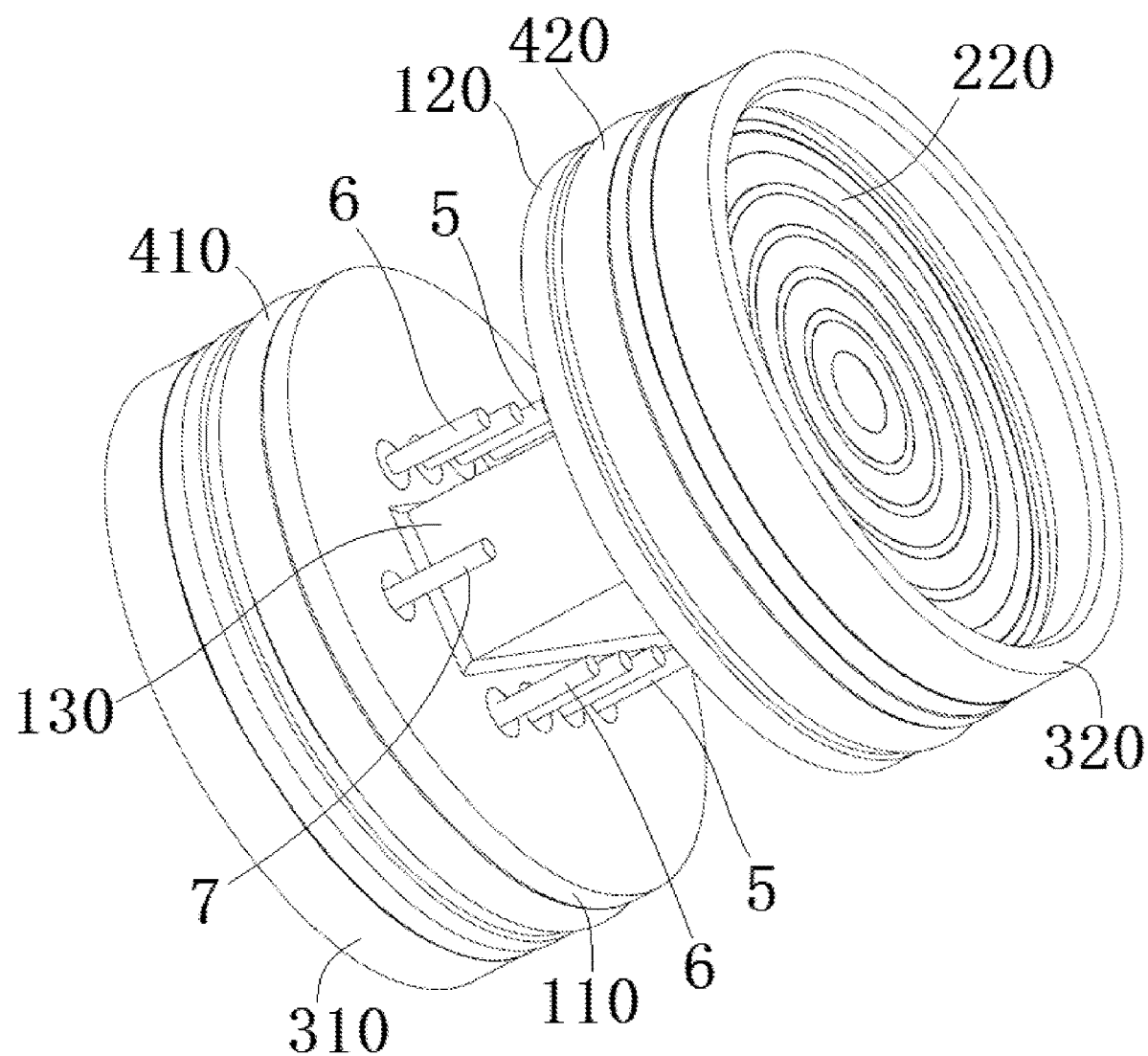
FIG. 1 is a perspective view of a sensing device according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
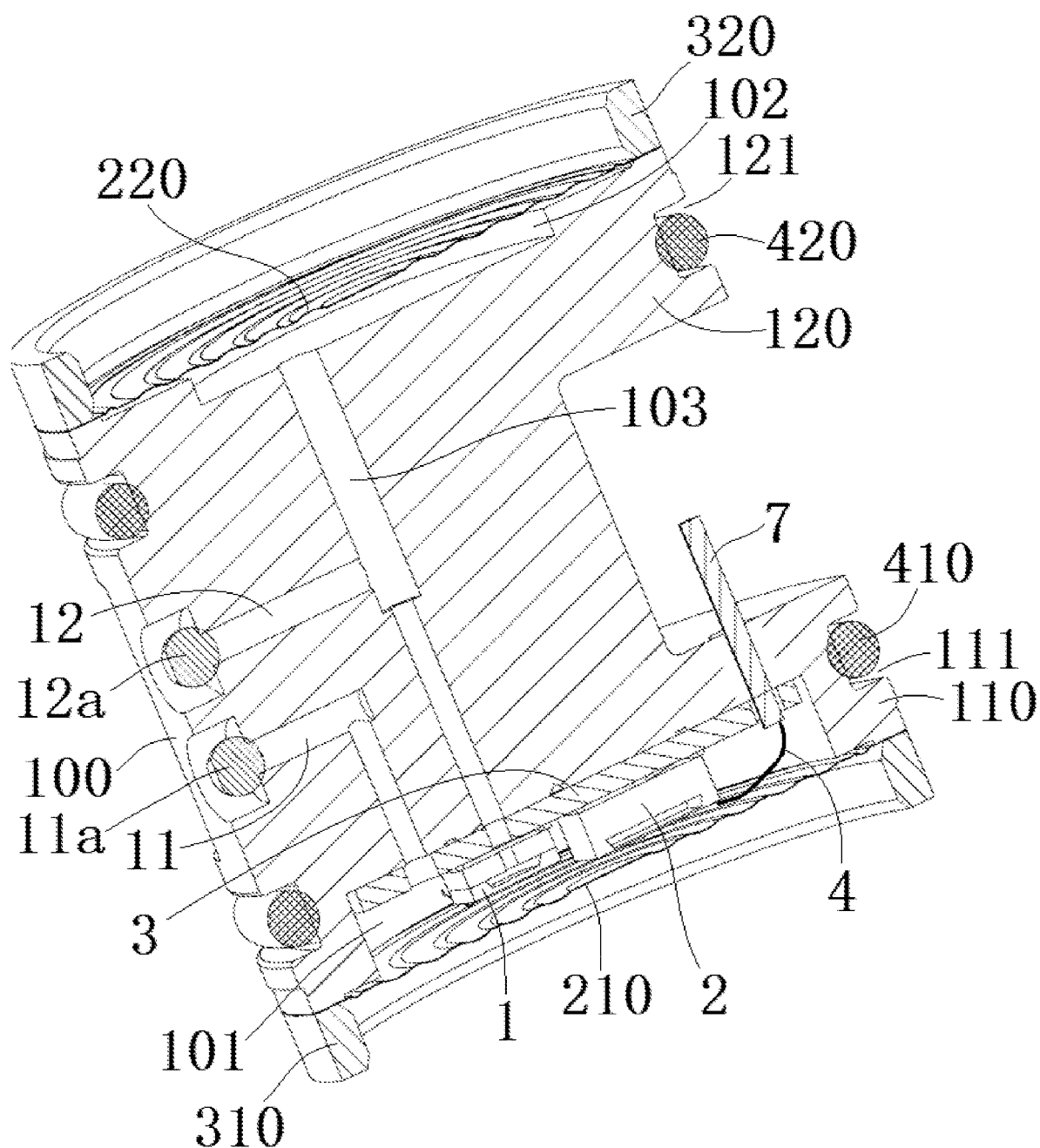
FIG. 2 is a sectional perspective view of the sensing device of FIG. 1.
Figure 3:
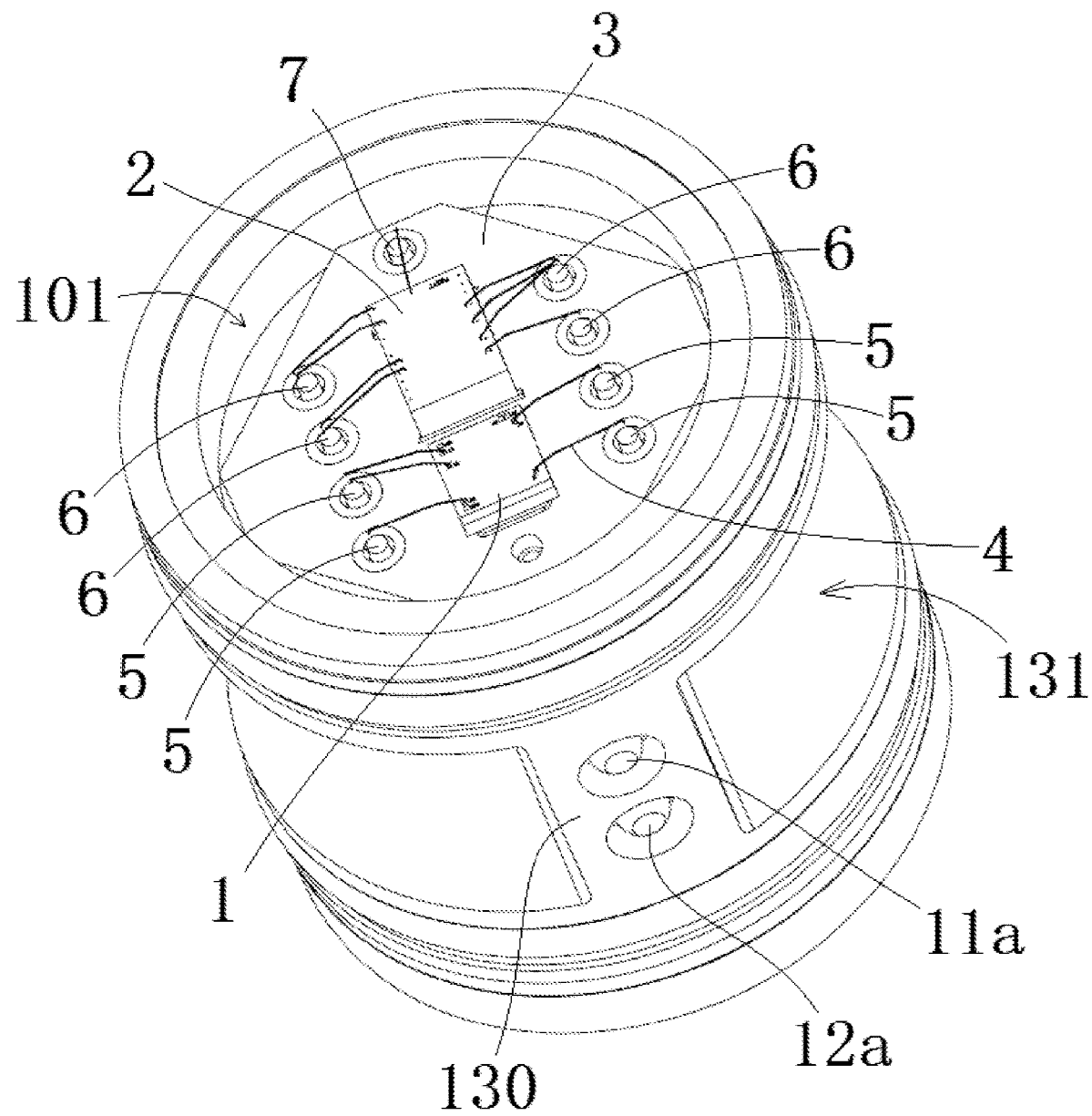
FIG. 3 is a perspective view of the sensing device of FIG. 1, in which a first diaphragm is removed to show an internal structure of a first chamber.

As shown in FIGS. 1 to 3, in the illustrated embodiment, the sensing device includes a body 100, a pressure difference detection chip 1, and a pressure detection chip 2. A first chamber 101, a second chamber 102, and a liquid path 103 for filling a liquid (E. G., oil) are formed in the body 100. The liquid path 103 communicates with the second chamber 102. The pressure difference detection chip 1 is installed in the first chamber 101 and seals an opening of the liquid path 103 formed on the bottom surface of the first chamber 101 for detecting the liquid pressure difference between the first chamber 101 and the second chamber 102. The pressure detection chip 2 is installed in the first chamber 101 to detect the liquid pressure in the first chamber 101.

As shown in FIGS. 1 to 3, in the illustrated embodiment, the first diaphragm 210 is attached to the opening of the first chamber 101 for transmitting a first external pressure to the liquid in the first chamber 101. The second diaphragm 220 is attached to the opening of the second chamber 102 for transmitting a second external pressure to the liquid in the second chamber 102.

Figure 5:
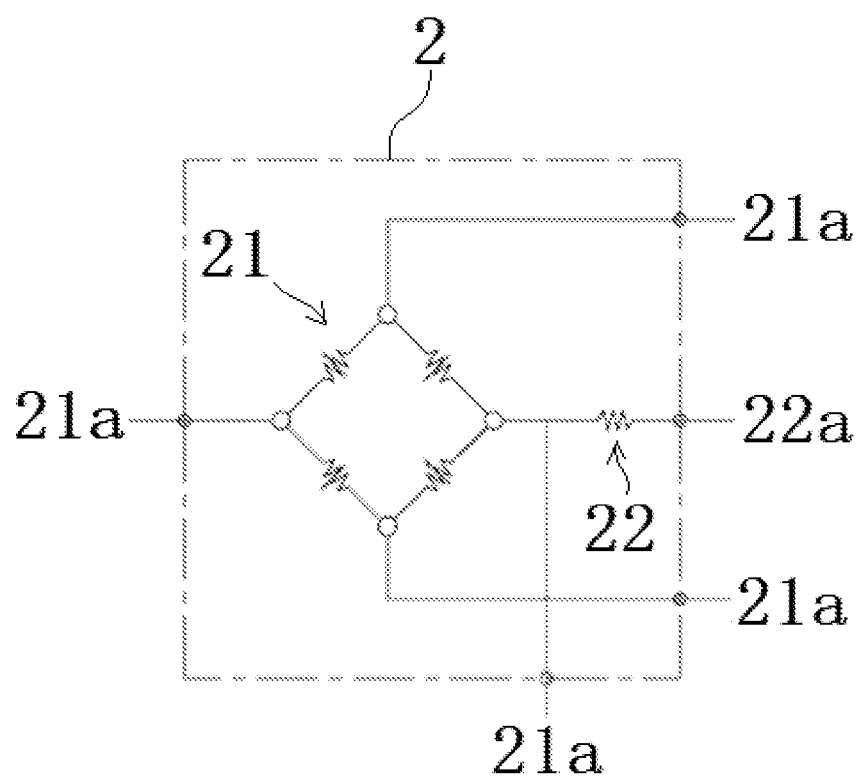
FIG. 5 is a schematic diagram of a pressure detection circuit and a temperature detection element of a pressure detection chip according to an embodiment.

In an exemplary embodiment of the present invention, a temperature detection element 22 is integrated in the pressure difference detection chip 1 or the pressure detection chip 2, as shown in FIG. 5, to detect the temperature of the liquid in the first chamber 101.

As shown in FIGS. 2 and 3, in the illustrated embodiment, the sensing device further comprises a base plate 3, which is installed in the first chamber 101. The pressure difference detection chip 1 and the pressure detection chip 2 are installed on the base plate 3.

As shown in FIG. 3, in the illustrated embodiment, the base plate 3 is fixed to the bottom surface of the first chamber 101 and formed with a through hole communicates with the opening of the liquid path 103 formed on the bottom surface of the first chamber 101. The pressure difference detection chip 1 seals the through hole of the base plate 3. In an embodiment, the base plate 3 may be bonded to the bottom surface of the first chamber 101 by an adhesive.

Figure 4:
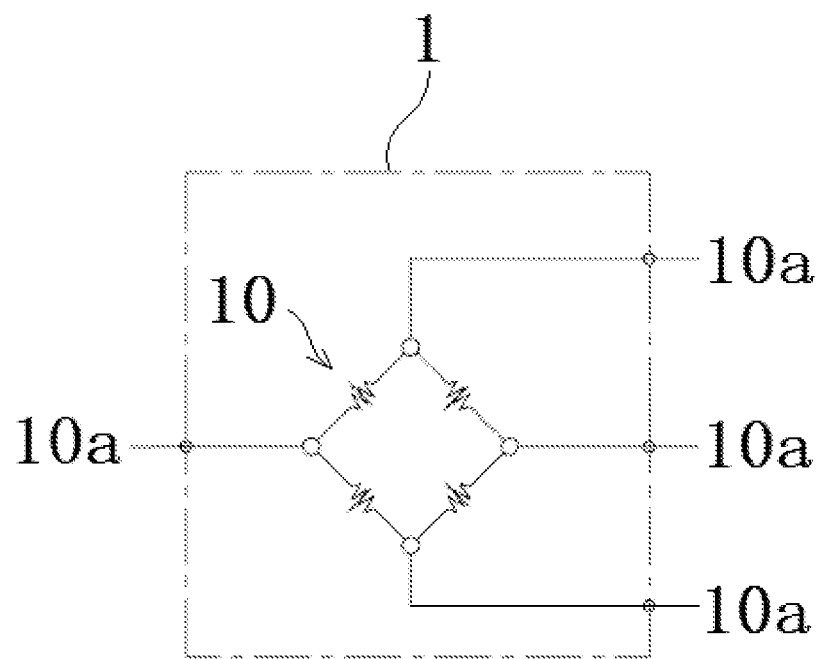
FIG. 4 is a schematic diagram of a differential pressure detection circuit of a pressure difference detection chip according to an embodiment.

FIG. 4 shows an illustrative view of the differential pressure detection circuit 10 of the pressure difference detection chip 1 according to an exemplary embodiment of the present invention. FIG. 5 shows an illustrative view of the pressure detection circuit 21 and the temperature detection element 22 of the pressure detection chip 2 according to an exemplary embodiment of the present invention.

As shown in FIG. 4, the pressure difference detection chip 1 includes a differential pressure detection circuit 10 and a plurality of first pins 10a connected to the differential pressure detection circuit 10. The pressure detection chip 2, as shown in FIG. 5, includes a pressure detection circuit 21 and a plurality of second pins 21a connected to the pressure detection circuit 21.

As shown in FIGS. 1 and 3, in the illustrated embodiment, the sensing device further comprises a plurality of first terminals 5 electrically connected to the plurality of first pins 10a, and a plurality of second terminals 6 electrically connected to the plurality of second pins 21a. A plurality of first terminals 5 and a plurality of second terminals 6 pass through the base plate 3 and extend to the outside of the body 100. The plurality of first terminals 5 and the plurality of second terminals 6 are arranged in two rows.

As shown in FIG. 5, the temperature detection element 22 is integrated in the pressure detection chip 2. The pressure detection chip 2 further comprises a third pin 22a connected to one end of the temperature detection element 22, and the other end of the temperature detection element 22 is electrically connected to one of the plurality of second pins 21a (negative output pin). The sensing device further comprises a third terminal (temperature output terminal) 7, shown in FIGS. 1 to 3, which is electrically connected to the third pin 22a. The third terminal 7 passes through the base plate 3 and extends out of the body 100.

As shown in FIGS. 2 and 3, in the illustrated embodiment, the pressure difference detection chip 1 and the pressure detection chip 2 are welded to the base plate 3. The first pin 10a, the second pin 21a and the third pin 22a are electrically connected to the first terminal 5, the second terminal 6 and the third terminal 7 respectively through welding wires 4.

In an embodiment, the base plate 3 is a ceramic base plate, and the pressure difference detection chip 1 and the pressure detection chip 2 are welded to the base plate 3 in a surface mount manner. The first pin 10a, the second pin 21a and the third pin 22a are electrically connected to the first terminal 5, the second terminal 6 and the third terminal 7 respectively through the conductive traces formed on the base plate 3.

As shown in FIGS. 1 and 2, in the illustrated embodiment, the body 100 includes a first end 110 and a second end 120 opposite in its axial direction, and the first chamber 101 and the second chamber 102 are formed in the first end 110 and the second end 120, respectively. The body 100 has a concave space 131, shown in FIG. 3, which is formed between the first end 110 and the second end 120 of the body 100 and is opened to the outside of the body 100. The first terminal 5, the second terminal 6 and the third terminal 7 extend into the concave space 131 of the body 100.

As shown in FIGS. 1 to 5, in the illustrated embodiment, the body 100 further comprises a connection part 130 connected between the first end 110 and the second end 120. The connection part 130 is in a rectangular column shape. Some of the first terminals 5 and the second terminals 6 are arranged on one side of the connection part 130 and arranged in a row. Others of the first terminals 5 and the second terminals 6 are arranged on the other side of the connection part 130 and arranged in a row. The third terminal 7 is arranged at one end of the connection part 130.

As shown in FIG. 2, a first liquid filling channel 11 communicating with the first chamber 101 and a second liquid filling channel 12 communicating with the second chamber 102 are also formed in the body 100. The sensing device further comprises a first seal 11a for sealing the inlet of the first liquid filling channel 11 and a second seal 12a for sealing the inlet of the second liquid filling channel 12. The second liquid filling channel 12 communicates with the second chamber 102 through the liquid path 103, and the first seal 11a and the second seal 12a are spherical seals. Note that the present invention is not limited to the illustrated embodiment. For example, the second liquid filling channel 12 can also be directly connected with the second chamber 102.

As shown in FIGS. 1 and 2, in the illustrated embodiment, the sensing device further comprises a first welding ring 310 welded on the outside of the first diaphragm 210 and a second welding ring 320 welded on the outside of the second diaphragm 220. The first diaphragm 210 is welded to the body 100 by the first welding ring 310, and the second diaphragm 220 is welded to the body 100 by the second welding ring 320.

In one embodiment of the present invention, the first diaphragm 210, the first welding ring 310, the second diaphragm 220, and the second welding ring 320 are made of metal. In an exemplary embodiment of the present invention, the aforementioned body 100 may be accommodated in a housing.

As shown in FIG. 2, in the illustrated embodiment, a first annular positioning groove 111 and a second annular positioning groove 121 are formed on the peripheral surfaces of the first end 110 and the second end 120 of the body 100, respectively. The sensing device further comprises a first seal ring 410 and a second seal ring 420 installed in the first annular positioning groove 111 and the second annular positioning groove 121, respectively. The first seal ring 410 and the second seal ring 420 can realize the sealing between the body and the housing to prevent water from entering the housing.

In the embodiments shown in FIGS. 1 to 5, the pressure difference detection chip 1 and the pressure detection chip 2 are installed in the same chamber, but the present invention is not limited to the illustrated embodiment. For example, in another exemplary embodiment of the present invention, the pressure difference detection chip 1 and the pressure detection chip 2 can be installed in the first chamber 101 and the second chamber 102, respectively.

In an exemplary embodiment of the present invention, the sensing device may further comprise a first insert inserted into the first chamber 101, and the first insert has a certain volume, thereby reducing the amount of liquid that needs to be filled into the first chamber 101. Similarly, the sensing device may further comprise a second insert, which is inserted into the second chamber 102 to reduce the amount of liquid that needs to be filled into the second chamber 102.

Figure 6:
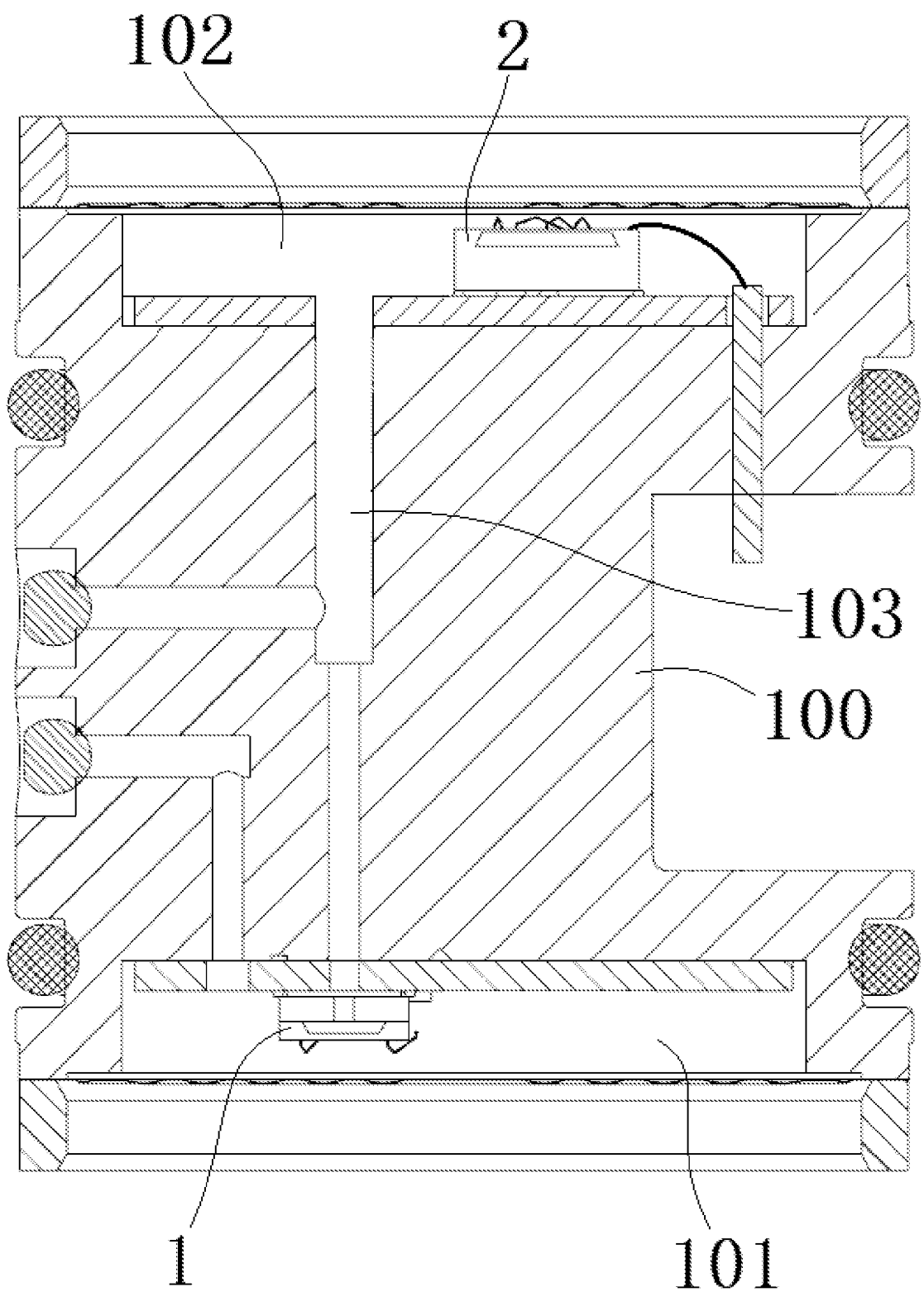
FIG. 6 is a sectional side view of a sensing device according to another embodiment.

As shown in FIG. 6, a sensing device according to another embodiment includes a body 100, a pressure difference detection chip 1, and a pressure detection chip 2. A first chamber 101, a second chamber 102, and a liquid path 103 for filling liquid are formed in the body 100. The liquid path 103 communicates with the second chamber 102. The pressure difference detection chip 1 is installed in the first chamber 101 and seals an opening of the liquid path 103 formed on the bottom surface of the first chamber 101 for detecting the liquid pressure difference between the first chamber 101 and the second chamber 102. The pressure detection chip 2 is installed in the second chamber 102 to detect the liquid pressure in the second chamber 102.

A temperature detection element 22 (see FIG. 4) may be integrated in the pressure difference detection chip 1 to detect the liquid temperature in the first chamber 101; and/or a temperature detection element 22 (see FIG. 4) may be integrated in the pressure detection chip 2 to detect the liquid temperature in the second chamber 102.

In addition to the above differences, the embodiment shown in FIG. 6 has basically the same other technical features as the embodiment shown in FIGS. 1-5, and the other technical features can refer to the embodiment shown in FIGS. 1-5.

In the above-mentioned exemplary embodiments according to the present invention, the sensing device can detect the pressure and differential pressure at the same time, which expands the application range of the product and is convenient to use. In addition, in some of the foregoing exemplary embodiments of the present invention, the sensing device can also detect the temperature, further expanding the application range of the product.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sensing device, comprising:
a body having a first chamber, a second chamber, and a liquid path which are filled with a liquid, the liquid path communicates with the second chamber;
a pressure difference detection chip installed in the first chamber and sealing an opening of the liquid path disposed on a bottom surface of the first chamber, the pressure difference detection chip detecting a liquid pressure difference between the first chamber and the second chamber; and
a pressure detection chip installed in the first chamber and detecting a liquid pressure in the first chamber.

2. The sensing device according to claim 1, further comprising:
a first diaphragm attached to an opening of the first chamber and transmitting a first external pressure to the liquid in the first chamber; and
a second diaphragm attached to an opening of the second chamber and transmitting a second external pressure to the liquid in the second chamber.

3. The sensing device according to claim 1, wherein a temperature detection element is integrated in the pressure difference detection chip or the pressure detection chip and detects a temperature of the liquid in the first chamber.

4. The sensing device according to claim 3, further comprising a base plate installed in the first chamber, the pressure difference detection chip and the pressure detection chip are installed on the base plate.

5. The sensing device according to claim 4, wherein the base plate is fixed to the bottom surface of the first chamber and forms a through hole communicating with the opening of the liquid path, the pressure difference detection chip seals the through hole of the base plate.

6. The sensing device according to claim 4, wherein the pressure difference detection chip has a differential pressure detection circuit and a plurality of first pins connected with the differential pressure detection circuit, and the pressure detection chip has a pressure detection circuit and a plurality of second pins connected with the pressure detection circuit.

7. The sensing device according to claim 6, further comprising a plurality of first terminals respectively electrically connected with the plurality of first pins and a plurality of second terminals respectively electrically connected with the plurality of second pins.

8. The sensing device according to claim 7, wherein the plurality of first terminals and the plurality of second terminals pass through the base plate and extend to an outside of the body, the plurality of first terminals and the plurality of second terminals are arranged in two rows.

9. The sensing device according to claim 7, wherein the temperature detection element is integrated in the pressure detection chip, the pressure detection chip has a third pin connected with one end of the temperature detection element, and the other end of the temperature detection element is electrically connected to one of the plurality of second pins, the sensing device further comprises a third terminal that is electrically connected with the third pin, passes through the base plate, and extends to an outside of the body.

10. The sensing device according to claim 9, wherein the pressure difference detection chip and the pressure detection chip are welded on the base plate, the first pin, the second pin, and the third pin are electrically connected to the first terminal, the second terminal, and the third terminal respectively through a welding wire.

11. The sensing device according to claim 9, wherein the base plate is a ceramic base plate, and the pressure difference detection chip and the pressure detection chip are welded on the base plate in a surface mount manner, the first pin, the second pin, and the third pin are electrically connected to the first terminal, the second terminal, and the third terminal respectively through a conductive trace formed on the base plate.

12. The sensing device according to claim 9, wherein the body includes a first end and a second end opposite in an axial direction, the first chamber and the second chamber are formed in the first end and the second end respectively, the body has a concave space which is formed between the first end and the second end of the body and opened to the outside of the body, the first terminal, the second terminal, and the third terminal pass through the body and extend into the concave space of the body.

13. The sensing device according to claim 12, wherein the body has a connection part connected between the first end and the second end, the connection part has a rectangular column shape, some of the first terminals and the second terminals are arranged on one side of the connection part and arranged in a row, others of the first terminals and the second terminals are arranged on the other side of the connection part and arranged in a row, the third terminal is arranged at one end of the connection part.

14. The sensing device according to claim 1, wherein a first liquid filling channel communicating with the first chamber and a second liquid filling channel communicating with the second chamber are formed in the body, the sensing device further comprises a first seal sealing an inlet of the first liquid filling channel and a second seal sealing an inlet of the second liquid filling channel.

15. The sensing device according to claim 14, wherein the second liquid filling channel communicates with the second chamber through the liquid path, the first seal and the second seal are spherical seals.

16. The sensing device according to claim 2, further comprising:

a first welding ring welding a periphery of the first diaphragm to the body; and a second welding ring welding a periphery of the second diaphragm to the body.

17. The sensing device according to claim 12, wherein a first annular positioning groove and a second annular positioning groove are respectively formed on a plurality of outer peripheral surfaces of the first end and the second end of the body, the sensing device further comprises a first sealing ring installed in the first annular positioning groove and a second sealing ring installed in the second annular positioning groove.

18. The sensing device according to claim 1, further comprising:
  a first insert inserted into the first chamber to reduce an amount of liquid that needs to be filled into the first chamber; and/or
  a second insert inserted into the second chamber to reduce an amount of liquid that needs to be filled into the second chamber.

19. A sensing device, comprising:
  a body having a first chamber, a second chamber, and a liquid path filled with a liquid, the liquid path communicates with the second chamber;
  a pressure difference detection chip installed in the first chamber and sealing an opening of the liquid path formed on a bottom surface of the first chamber, the pressure difference detection chip detecting a liquid pressure difference between the first chamber and the second chamber; and
  a pressure detection chip installed in the second chamber and detecting a liquid pressure in the second chamber.

20. The sensing device according to claim 19, wherein:
  a temperature detection element is integrated in the pressure difference detection chip and detects a liquid temperature in the first chamber; and/or
  the temperature detection element is integrated in the pressure detection chip and detects the liquid temperature in the second chamber.

* * * * *